Dec. 19, 1961     F. W. SAMPSON     3,013,637
BRAKE
Filed Nov. 28, 1958
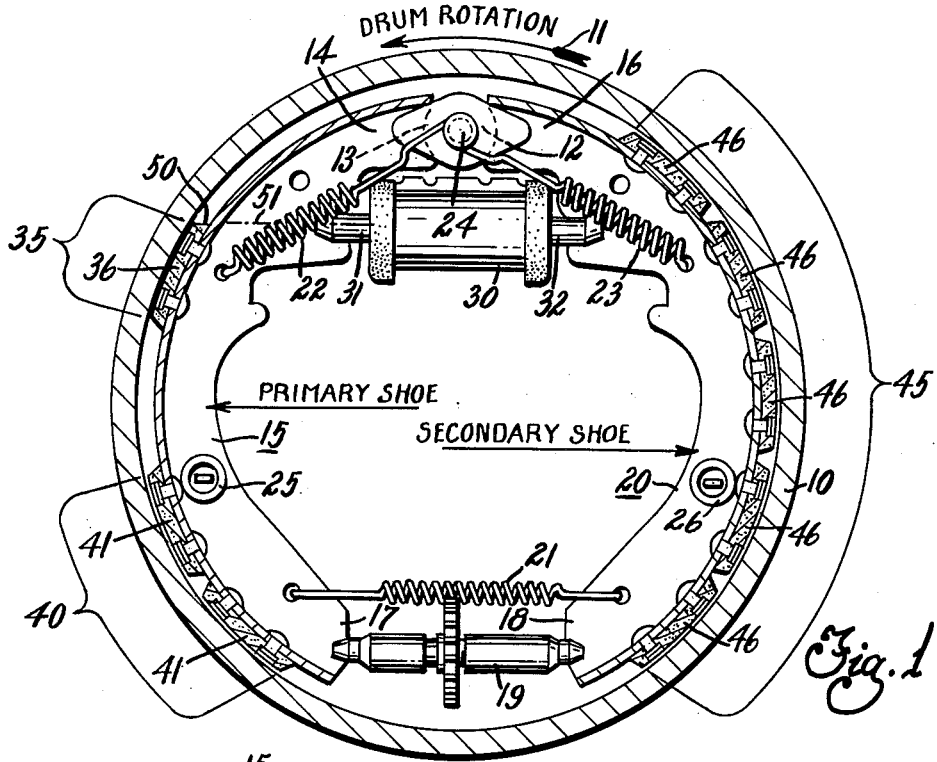
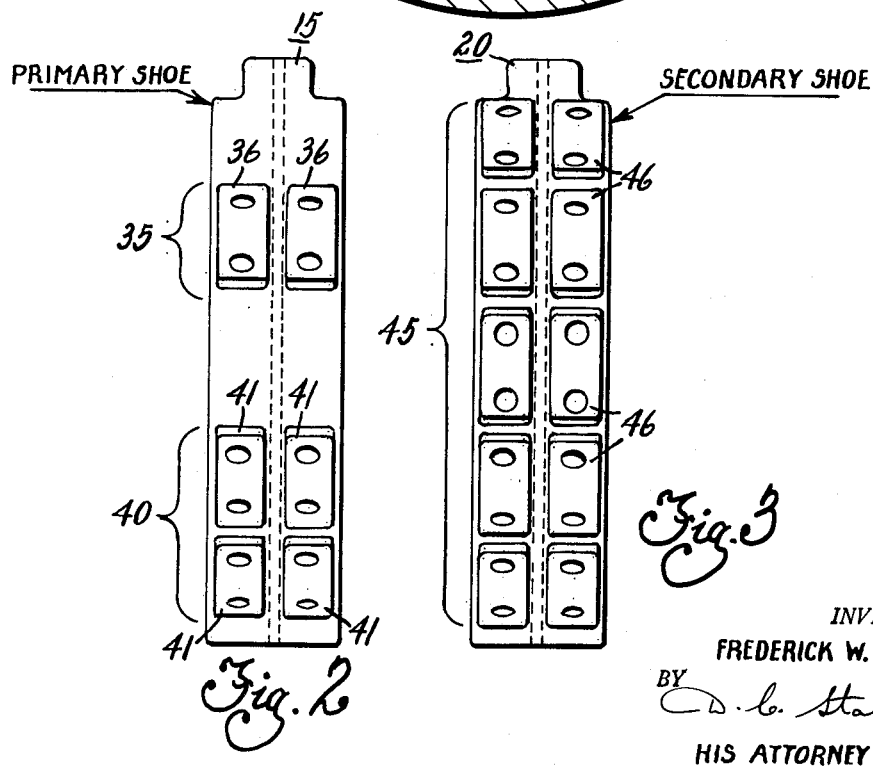
INVENTOR.
FREDERICK W. SAMPSON
BY
HIS ATTORNEY

United States Patent Office 3,013,637
Patented Dec. 19, 1961

3,013,637
BRAKE
Frederick W. Sampson, Dayton, Ohio, assignor to General Motors Corporation, Detroit, Mich., a corporation of Delaware
Filed Nov. 28, 1958, Ser. No. 776,981
5 Claims. (Cl. 188—78)

This invention relates to brake structures particularly for motor vehicles, and more particularly relates to friction surfacing materials carried on the brake shoes and adapted for engagement with the brake drum. More particularly, the invention relates to a drum type brake that includes a pair of brake shoes movable into engagement with the brake drum to effect braking operation.

One form of brake that is particularly adapted for use with this invention is that known in the art as a duo-servo brake. This type of brake incorporates a pair of brake shoes positioned within a brake drum with cooperating adjacent ends of the brake shoes operably connected with and engaging an anchor means or anchor pin positioned between the cooperating adjacent ends of the brake shoes, the brake shoes in effect being suspended from the anchor means or anchor pin when the brake shoes are in released position relative to the brake drum. The opposite adjacent cooperating ends of the brake shoes are interconnected in a manner that one of the brake shoes will tend to rotationally drive the other of the brake shoes when the shoes are in engagement with the brake drum, the driving brake shoe normally being referred to as the primary brake shoe and producing a servo action on the other brake shoe, commonly known as the secondary shoe, whereby the output of the brake is increased by the driving action of the primary shoe on the secondary brake shoe.

Brakes of this general type are well known in the art and have been used conventionally with organic friction surfacing materials on the brake shoes.

However, modern automotive developments are imposing extreme operating conditions on the conventional type of friction brakes incorporating conventional types of organic friction materials used as the lining elements on the brake shoes. These organic friction materials have been conventionally composed of asbestos, cotton linters and the like that are bonded together with a synthetic resin, such as a phenol formaldehyde resin, the mixture being molded into brake lining elements which may either be bonded to the metal brake shoes or riveted to the shoes.

While these organic friction materials are satisfactory under normal driving conditions, they are rapidly becoming unsatisfactory for use as brake materials as the trend in automotive design moves toward heavier and higher powered vehicles. This is becoming apparent when motor vehicles driven at high speeds are required to make repeated high-speed stops at relatively short intervals and when the brakes of the vehicle are required to be used in regarding the speed of the vehicle when moving down long or steep grades. As the temperature of these organic brake materials increase, they reach a point at which the coefficient of friction falls off exceedingly rapidly with the result known in the art as "brake fading." In fact, if the material becomes too hot, complete brake failure can result.

The trend in the art, therefore, is toward development of brakes and friction surfacing materials that are not affected to any substantial degree by temperature rise resulting from heavy-duty braking operations. Such materials have been found in certain metallic compositions whereby the friction surfacing material, or lining elements, are metallic members for engaging the brake drum surface to obtain the desired degree of braking action. Such metallic elements or friction surfacing materials have been made from sintered powdered ferrous materials, the composition of the sintered ferrous materials being compounded with other components to modify the physical characteristics of the sintered material to obtain desirable strength and physical characteristics as well as desirable cofficient of friction that will permit the use of such materials as friction elements in vehicle brakes.

In the course of the development of these metallic friction materials, it has been found there is a substantial problem of obtaining quiet-acting materials that will compare favorably with the quietness of organic materials in the brake operation. The use of metallic friction members has resulted in considerable amount of high-pitch squeak and rasping noise during the application of the brake, and has resulted in grunt and groan when the vehicle is about to reach a complete stop. Also, there has been a tendency for the metallic friction materials to produce a grabbing action when the coefficient of friction of the material is sufficiently high to produce a satisfactory level of brake output for a given size brake.

Generally speaking, it has been found that when the coefficient of friction of the metallic friction material is relatively high, use of the material is accompanied by a substantial amount of noise in the brake operation. Therefore, even though the brake output of these metallic friction materials having high coefficient of friction is satisfactory, their noise level is such as to make their use in automotive vehicles quite objectionable.

On the other hand, when the coefficient of friction of the metallic friction material is relatively low, it has been found that the materials have a satisfactorily low noise level which will permit their use in automotive vehicles, but the brake output of such materials is at such a low level as to result in unsatisfactory brake operation without increasing the size of the brake to such an extent that the brake becomes abnormally large and cumbersome. This is a decided disadvantage when the entire automotive trend is toward smaller wheels with the result that the brake has to be squeezed into less space than previously.

All of this reaches but one conclusion, that is, if a satisfactory noise level is to be obtained by the use of metallic friction materials having a low coefficient of friction, ways must be found to increase the brake output without in any way increasing the size of the brake.

It is, therefore, an object of this invention to provide a brake, particularly of the drum and shoe type, wherein the metallic friction surfacing material on the secondary brake shoe, which is the brake shoe which does the major brake operation, is a material having a low coefficient of friction to obtain a low noise level, and to provide the primary brake shoe, which drives the secondary brake shoe, with a metallic friction surfacing material that has a substantially higher coefficient of friction than that which is carried on the secondary brake shoe so that the output from the primary shoe to drive the secondary shoe will be of a relatively high value and thereby increase the brake output of the secondary shoe.

In accomplishing the foregoing object of the invention, the primary brake shoe is provided with two areas of metallic friction surfacing material each of which has a coefficient of friction higher than the coefficient of friction of a friction surfacing material on the secondary shoe and wherein one of the areas of friction surfacing material on the primary shoe is adjacent the toe or leading edge of the shoe and the other is adjacent the heel or trailing edge of the shoe with the coefficient of friction of the friction surfacing material at the toe or leading edge of the shoe being of a substantially greater value than the coefficient of friction of the friction surfacing material at the heel or trailing edge of the shoe.

By establishing an arrangement of friction surfacing materials on the primary and secondary shoes of a duo-servo type brake wherein the coefficient of friction of the friction surfacing materials decreases from an anchor point for the shoes in the direction of rotation of the drum, the brake output is retained at a satisfactory high level because the metallic friction material at the toe of the primary shoe having the highest coefficient of friction will produce a high rotative torque into the secondary shoe to increase the pressure of engagement of the secondary shoe with the brake drum and thereby raise the brake output substantially above a level that could be produced if friction surfacing material of the same coefficient of friction were used on the primary shoe as is used on the secondary shoe. In addition, since the coefficient of friction of the metallic friction material at the heel of the primary shoe is also higher than the coefficient of friction of the metallic friction material on the secondary shoe, the driving effect of the friction surfacing material at the toe of the primary shoe as well as the driving effect of the material at the heel of the shoe will be cumulative to greatly increase the force applied to the secondary shoe to effect its engagement with the brake drum.

Also, since in a duo-servo type of brake the actuating force to move the brake shoes into engagement with the brake drum is conventionally applied to a force line between the primary and secondary shoes adjacent the anchor end of the shoes, and since the secondary shoe has one end engaging the anchor means, and is therefore stationary, the brake actuating force produced by the operator of the vehicle is effective primarily on the primary shoe to move it into engagement with the brake drum.

With the operator-applied brake applying force being a substantially lesser force than that created by the torque movement of the primary shoe to effect pressure engagement of the secondary shoe with the brake drum, the use of a friction surfacing material having a high coefficient of friction at the toe portion of the primary brake shoe will produce a high friction force with the brake drum whereby to produce a high torque effect in the primary shoe to be applied to the secondary shoe. But since the surface area of the friction material of high coefficient of friction is substantially less than the area of the friction material on the secondary shoe, and since the force applied to the metallic friction material of high coefficient of friction is substantially less than the force applied to the friction material on the secondary shoe having the low coefficient of friction, the noise level of the small area of friction material of high coefficient of friction is retained at a low value because of the lesser force effecting engagement of the material with the brake drum. The result is that the metallic friction material of low coefficient of friction on the secondary shoe can, therefore, be worked harder, because of its low noise level, and still obtain a satisfactory level of brake output.

The metallic friction surfacing material at the heel or trailing edge of the primary brake shoe has a coefficient of friction that is less than the coefficient of friction of material at the toe of the primary shoe for the reason that the force engaging the friction material at the heel of the primary shoe with the drum is substantially greater than the force applying the friction material to the drum at the toe of the primary shoe, the heel portion of the shoe receiving torque driving force created by engagement of the friction material at the toe of the primary shoe with the drum. Therefore, to retain the noise level at a satisfactory low value, the coefficient of friction of the material at the heel of the primary shoe is less than that at the toe of the shoe, but with the coefficient of friction of the material at the heel of the primary shoe being greater than that of the secondary shoe, both friction materials on the primary shoe are cumulative in their effect of driving the secondary shoe into engagement with the brake drum to produce a high value brake output.

Further objects and advantages of the present invention will be apparent from the following description, reference being had to the accompanying drawings wherein preferred embodiments of the present invention are clearly shown.

In the drawings:

FIG. 1 is a cross-sectional view of a duo-servo brake incorporating features of this invention.

FIG. 2 is an elevational view of the primary brake shoe.

FIG. 3 is an elevational view of the secondary brake shoe.

In the drawings there is illustrated a brake structure of a duo-servo type adapted for incorporation of the arrangement of friction surfacing material or brake linings or elements of this invention.

The duo-servo brake illustrated in the drawings consists of a brake drum 10 adapted to be secured on the wheel of a vehicle in any conventional manner. The drum of FIG. 1 is adapted for counterclockwise rotation, in the direction of the arrow 11. An anchor means 12 is positioned within the drum and is carried on the backing plate for the brake in a manner well known in the art. The anchor pin is, therefore, a stationary element as supported upon the nonrotating or stationary backing plate that is mounted in any conventional manner upon a nonrotating part of the vehicle, such as the axle flange on the steering knuckle of the front wheel support structure or on the axle housing flange of a rear wheel structure, which mounting arrangements are conventional and well known in the art.

As shown in FIG. 1, the anchor means 12 consists of a stud having a cylindrical portion 13 that is engaged by the cooperating adjacent ends 14 and 16 of the brake shoes 15 and 20 respectively. The opposite adjacent ends 17 and 18 of the brake shoes 15 and 20 engage an adjusting strut 19, a tension spring 21 being provided to retain the ends 17 and 18 of the brake shoes against the adjusting strut 19. The ends 14 and 16 of the brake shoes 15 and 20 are held in engagement with the anchor stud 12 by means of the tension springs 22 and 23 that extend between the shoes 15 and 20 respectively and the projection 24 on the anchor stud 12.

From the foregoing description it will be apparent that the brake shoes 15 and 20 are suspended from the anchor stud 12 and are free for movement within the brake drum. The brake shoes 15 and 20 are, however, retained in sliding engagement with the backing plate of the brake by means of the spring elements 25 and 26, the arrangement being well known in the art.

Actuation of the brake is obtained by delivery of hydraulic fluid under pressure from a master cylinder, not shown, to the wheel cylinder 30 that has a pair of pistons slidable internally in the wheel cylinder, the pistons including the plunger members 31 and 32 that extend from opposite ends of the cylinder 30 into engagement with the brake shoes 15 and 20 respectively. The wheel cylinder 30 is mounted on the backing plate for the brake in a manner well known in the art and is, therefore, a stationary member.

With the direction of rotation of the brake drum 10 being in the direction of the arrow 11, the brake shoe 15 is conventionally termed the primary shoe and the brake shoe 20 is conventionally termed the secondary shoe.

In this invention the primary shoe carries a first area of friction surfacing material 35 which, as shown in FIG. 2, consists of two brake shoe lining elements 36 arranged in side-by-side relationship. The primary brake shoe 15 also carries a second area of friction surfacing material 40 which consists of the four lining elements 41, arranged as shown in FIG. 2, equivalent to approximately twice the first area.

The secondary brake shoe 20 has the major working area of friction surfacing material, this area of surfacing material covering substantially the entire peripheral surface of the secondary brake shoe, and as defined in this specification is identified by the reference numeral 45. This third area of friction surfacing material 45, which comprises the entire surface of the secondary brake shoe, includes a plurality of lining elements 46, arranged as shown in FIG. 3 of the drawings equivalent to approximately five times the first area.

In operation, when hydraulic fluid under pressure is delivered from a master cylinder to the wheel cylinder 30 of the duo-servo brake shown in the drawing, the plungers 31 and 32 move outwardly until the brake lining is brought into engagement with the brake drum 10. During the interval of time for moving the brake linings into engagement with the brake drum, no brake action is produced. In this movement of the brake linings into engagement with the brake shoe, both brake shoes 15 and 20 may pivot about the adjusting strut 19 and thereby move the adjacent cooperating ends 14 and 16 away from the cylindrical surface 13 of the anchor means 12, or one of the brake shoes may take this entire initial movement with the result that one of the cooperating ends 14 or 16 remain in engagement with the anchor means 12 and the other moves away from the anchor. The specific initial movements of the brake shoes 15 and 20 depends largely upon the frictional value between the brake shoes and the backing plate as created by the springs 25 and 26. Regardless of the specific initial movement of the brake shoes 15 and 20, which movements do not enter into the brake action created subsequently, when the lining elements of the brake shoes engage the rotating drum 10, the brake shoes are then rotated in the direction of the drum with the end 16 of the secondary brake shoe 20 being forced into engagement with the anchor pin 12, the primary brake shoe 15 having the end 14 moving away from the anchor pin 12.

As hydraulic pressure is increased within the wheel cylinder 30, the plungers 31 and 32 of the wheel cylinder both still tend to urge the brake shoes 15 and 20 for pivotal rotation about the adjusting strut 19. But with the brake shoes now in engagement with the brake drum, the brake shoes tend to rotate counterclockwise in the direction of the rotation of the drum so that the plunger 32 is, in effect, a stationary member so that the resulting hydraulic force in the wheel cylinder is applied to the plunger 31 tending to move it outwardly to effect further pressure engagement of the primary brake shoe 15 with the brake drum.

From the foregoing it will be apparent that there are two forces acting on the brake shoes 15 and 20, one of which is the direct hydraulic force from the wheel cylinder 30 and the other of which is the rotative force or rotative torque applied to the primary brake shoe 15 by rotation of the drum 10 which, in turn, applies that rotative torque to the secondary brake shoe 20 to drive it into pressure engagement with the brake drum 10. It will be apparent that with the secondary brake shoe 20 being pivotally supported on the end of the adjusting strut 19, the rotative torque or drive torque of the primary shoe through the adjusting strut 19 works on the secondary brake shoe 20 to rotate it about the anchor pin 12 and thereby act as the lever to apply force to the secondary shoe to effect its pressure engagement with the drum. As a result, the pressure of engagement of the friction surfacing material on the secondary shoe 20 is far greater than the engagement pressure of the friction surfacing material on the primary shoe with the brake drum. In fact, the pressure of engagement of friction surfacing material in the first area 35 on the primary brake shoe with the drum 10 is primarily the engagement pressure created by the hydraulic force in the wheel cylinder 30 acting through the plunger member 31, which pressure of engagement is considerably less than the pressure of engagement of the friction surfacing material on the secondary brake shoe with the brake drum.

The friction surfacing material in the second area 40 on the primary brake shoe has an engagement pressure with the brake drum that results from the action of two forces, one of which is the hydraulic force in the wheel cylinder 30 acting through the plunger 31 tending to rotate the primary brake shoe 15 about the adjusting strut 19 as a pivot, the other of which is the rotative torque effect on the primary shoe resulting from engagement of the first area of friction surfacing material 35 with the brake drum 10. These two forces have an additive effect with the result that the pressure of engagement of the friction surfacing material in the second area 40 on the primary shoe 15 is greater than the pressure of engagement of the first area 35 on the primary shoe 15 but is still considerably less than the pressure of engagement of the friction surfacing material in the area 45 on the secondary brake shoe 20.

It has been found as a result of experimentation that the toe portion of the primary brake shoe, that is that lining area at the upper end of the primary brake shoe, as viewed in FIG. 1, shows considerably less wear than the lining area at the heel portion of the primary shoe, that is the lining area at the bottom end of the brake shoe, as viewed in FIG. 1, and this is true even though the entire peripheral surface of the primary brake shoe is covered with friction surfacing material. It has also been found that the wear pattern on the secondary brake shoe is relatively uniform over the surface area of the friction material.

In the development of this invention of applying metallic friction surfacing materials to brake shoes to overcome the disadvantages of previous and conventional organic brake linings, it became apparent that a proper and correct placement of areas of friction surfacing material on the primary brake shoe could result in creating a brake that would have the desired brake output, for the size of brake, and still be able to reduce the area of the friction surfacing material on the primary brake shoe. This discovery has a special advantage when applying metallic friction elements to brake shoes since it is desirable, if not completely necessary, to attach the metallic friction material to the brake shoes in segments, rather than as one continuous lining element. This is primarily for the reason that it has, thus far, been extremely difficult, or at least impractical, to manufacture metallic lining elements of rather substantial length for attachment to the brake shoes, the metallic linings having insufficiently flexibility to allow for flexing of the brake shoes and bell-mouthing of the brake drums that occurs in normal brake operation. Therefore, at least as of this time, the use of metallic brake lining members in the form of segments have been the most practical.

While the use of metallic friction surfacing materials in the form of segments is known in the art, and there has been developed certain compositions of metallic friction surfacing materials which have the satisfactory coefficient of friction to operate against cast iron brake drums and give a desired brake output for a given size brake drum and area of friction surfacing material, yet the materials have not been satisfactory from the standpoint of noise level, the metallic friction materials having a much higher noise level than organic friction materials of substantially the same coefficient of friction. Also, the use of metallic friction materials as friction elements has resulted in the development of high-pitch squeal or rasping noise when applying a brake or has resulted in a low-pitch grunt or groan as the brake action brings the vehicle to a stop. The high noise level, the high-pitch squeaks and the low-pitch grunts and groans are particularly objectionable when using metallic friction elements in the brakes of passenger vehicles.

During the course of the development of this invention, it was found that the high noise level factors or the squeals and grunts and groans is a characteristic of metallic friction surfacing materials when the coefficient of friction of the material is relatively high, and is sufficiently high to be able to give a satisfactory brake output for a given brake drum diameter and design.

On the other hand, it was found that when the coefficient of friction of the material is quite low, such materials have a characteristic of quietness with substantially complete elimination of the squeal or grunt and groan characteristics. When speaking of metallic friction surfacing materials in this invention, the materials being considered are sintered ferrous material modified to give desired physical characteristics. However, friction surfacing materials having a low coefficient of friction even though satisfactory from a noise level condition, would be unsatisfactory as the sole friction lining material for a brake when the trend of automotive development is toward smaller wheels and smaller brakes as is recognized in the automotive industry by the reduction of the wheel rim size from 15 inches to 14 inches in the last two years. Therefore, rather than using a friction surfacing material that requires large brakes and large friction surfacing areas to obtain the desired brake output, it is essential that some way be found to increase brake output and still be able to use metallic friction surfacing materials having a low coefficient of friction that are quiet. To make metallic friction surfacing materials, ferrous material (that is powdered iron) is compacted or briquetted under high pressure and the briquettes are then placed in a high temperature oven under a nonoxidizing condition to sinter the iron and thereby produce the metallic segments.

It was found that if the graphite content of the friction material was held between 20% and 30% by weight, the friction material produced would have the quietness desired but it also has a low coefficient of friction. Such a material is more particularly disclosed and described in Patent No. 2,945,292 of William A. Luther, Jr. and Roland P. Koehring, assigned to the same assignee as this application. One particular material that has been found to be especially suitable for this invention because of its characteristic of quietness is a sintered ferrous material having the following composition:

67 parts —250 mesh sponge iron powder
15 parts powdered artificial graphite (density 1.92 grams per cc., —325 mesh)
15 parts course flake natural graphite (density about 2.1 grams per cc., 20 to 30 mesh)
5 parts 150 mesh copper powder
5 parts 100 mesh bismuth powder
5 parts 100 mesh lead powder These ingredients are intimately mixed and are briquetted into a self-sustaining mass at about 60,000 to 90,000 lbs. per sq. in. and are then sintered for 40 minutes in a nonoxidizing atmosphere at 1800° F. The iron powder may have up to one percent of sulphur as an additive or an impurity, which helps to improve the wear characteristic of the material, with no apparent effect on the coefficient of friction of the material. The resulting friction surfacing material has excellent wear characteristics and is not harmfully affected by high temperatures reached during repeated high-speed stops. Furthermore, the metallic friction material does not exhibit the "fade" characteristics of nonmetallic frictional materials. Under actual road conditions, this friction material operates smoothly and silently, and does not exhibit any of the adverse characteristics of high-pitch squeals or grunt and groan when the vehicle is approaching a complete stop. However, the material exhibits a coefficient of friction of .25 which is relatively low with the result that rather large diameters or high pressures must be utilized to obtain desirable brake output. The coefficient of friction is that of the average coefficient of friction taken over the average operating temperature range of the sintered material when running against a cast iron finish under 20 microinches, which is an average smooth cast iron brake drum.

The metallic friction material disclosed contains the lubricating metals such as copper, bismuth, lead or cadmium to stabilize the frictional characteristics of the material under extremely heavy brake operations when the temperature rise of the brake linings exceeds the melting temperature of the lubricating metals, as more particularly disclosed and described in that application.

While metallic friction material such as that heretofore mentioned has certain properties of quietness and wear life that makes the material particularly useful in brakes, yet the low coefficient of friction of such material is unsatisfactory to obtain a desired brake output with a size or diameter of practical limits for use in passenger cars.

This applicant has discovered, however, that metallic friction materials having a high coefficient of friction can be used on the primary brake shoe where pressure engagement of the friction material with the drum is substantially lower than that of the engagement of the friction material with the drum on the secondary shoe. This can be done without creating any noise problem that has been the primary objection to the use of metallic friction material of high coefficient of friction on both the primary and secondary shoes. With friction material of high coefficient of friction being used on the primary shoe only, the output of the brake is greatly increased since the force of the driving torque of the primary shoe into the secondary shoe is increased in proportion to the increase in coefficient of friction of the friction material on the primary shoe.

But even on the primary brake shoe, it has been found to be highly desirable to make the coefficient of friction of the friction material on the toe of the primary shoe different from the coefficient of friction of the friction material at the heel of the primary shoe. This is for the reason that when the coefficient of friction of the friction material at the heel of the primary shoe is the same as that of the material at the toe of the shoe, the pressure of engagement of the friction material at the heel of the primary shoe with the brake drum being greater than that at the toe of the shoe will result in some of the undesirable noises that have heretofore been described. Therefore, at the heel of the primary shoe, the metallic friction material shall have a lower coefficient of friction than that placed at the toe of the primary shoe but it shall be greater than the coefficient of friction of the metallic friction material placed on the secondary shoe. Thus, the metallic friction material is tailored with a coefficient of friction that is proportioned inversely as the pressure of engagement of the friction material with the brake drum increases. Thus, at the toe of the primary shoe the coefficient of friction of the metallic friction material is the highest of any used in the brake structure while the coefficient of friction of the metallic friction material on the secondary shoe is the lowest of any used in the brake structure. The coefficient of friction of the metallic friction material at the heel of the primary shoe is between that of the material at the toe of the primary and that on the secondary shoe, preferably at about mid point between the extremes of the coefficients of friction of the other two materials.

Referring to FIG. 1 of the drawings, the metallic friction elements 36 in the first area of friction material 35 have a high coefficient of friction. The friction elements 46 on the secondary shoe in the third area of friction material 45 all have substantially the same low coefficient of friction whereas the friction elements 41 in the second area of friction material 40 have a coefficient of friction that is intermediate that of the elements 36 and 46. The result is that the friction elements 36 and 41 produce an additive effect of the force of the torque applied to the secondary shoe, the pressure of engagement of the secondary shoe thus being sufficiently high to produce the desired brake output even though the coefficient of friction of the the friction elements 46 is relatively low. Since the ferrous friction elements 46 have exceedingly good wearing properties when containing 30% graphite by weight, the high engagement pressure of the secondary shoe with the brake drum has no harmful effect in the wear life of the brake. Since the pressure of engagement of the friction members 36 at the toe of the primary shoe is less than that of any other of the friction elements, the wear life of the friction members of high coefficient of friction, which is somewhat shorter than the wear life of metallic elements of low coefficient of friction, is no special problem since the wear life of the high coefficient of friction material is increased because of the lesser engagement pressure of the material with the brake drum.

A sintered ferrous friction material that is particularly applicable for use as the friction elements 36 at the toe of the primary shoe is one having the following composition:

67 parts —250 mesh sponge iron powder
20 parts powdered artificial graphite (density 1.92 grams per cc., —325 mesh)
3 parts 150 mesh copper powder
5 parts 100 mesh lead powder
5 parts 100 mesh molybdenum disulfide powder
.75 part mullite These materials are intimately mixed and briquetted under pressures of 60,000 lbs. to 90,000 lbs. per sq. in. and are then sintered in a nonoxidizing atmosphere of about 1800° F. for a period of about 45 minutes. The iron powder may have up to one percent of sulphur as an additive or an impurity, which helps to improve the wear characteristic of the material, with no apparent effect on the coefficient of friction. The coefficient of friction of a metallic friction material having the above composition is .4 as calculated according to the average coefficient of friction on the average operating temperature range of the material as heretofore defined. Other friction materials having high coefficient of friction suitable for use as friction elements at the toe of the primary brake shoe 20 are those disclosed and described in Patent No. 2,945,291 of Thomas G. Ankeney and John W. Arnett. The mullite used in the composition is a ceramic material such as calcined kaolin or an aluminum silicate, the materials being known commonly by the term "mullite," which can be either a natural or a synthetic product.

The sintered ferrous friction material used in the friction elements 41 at the heel of the primary shoe 15 has a coefficient of friction that is approximately midway between the coefficient of friction of the friction elements 36 and the friction elements 46. A composition particularly useful as the friction elements 41 has a composition as follows:

67 parts —250 mesh sponge iron powder
15 parts powdered artificial graphite (density 1.92 grams per cc., —325 mesh)
15 parts coarse flake natural graphite (density about 2.1 grams per cc., 20 to 30 mesh)
5 parts 150 mesh copper powder
5 parts 100 mesh bismuth powder
5 parts 100 mesh lead powder
.5 part mullite These ingredients are intimately mixed, briquetted and sintered in the manner heretofore defined with reference to the other examples given herein. The coefficient of friction of this composition is .32, which is the average component of friction taken over the average operating temperature range of the sintered material as hereinbefore defined.

It will be noted that the composition of the sintered ferrous material used as the friction elements 41 on the heel of the primary shoe is the same as the composition of material used for the friction elements 46 on the secondary shoe, except that .5 part of mullite (calcined kaolin or aluminum silicate) has been added to the composition. The addition of this ceramic material to the composition increases the coefficient of friction so that the friction elements at the heel of the primary shoe can add to the force of the torque action of the primary shoe acting on the secondary shoe to pressure engage the secondary shoe with the brake drum. Also by retaining approximately 30% graphite in the friction elements used at the heel of the primary shoe, that is elements 41, the wear life characteristic of the elements 46 on the secondary shoe is obtained. But since the pressure of engagement of the elements 41 with the brake drum is less than the pressure of engagement of the elements 46 with the brake drum, the coefficient of friction of the elements 41 can be increased without creating adverse noise effects.

It will be noticed in FIG. 1 that the friction surfacing area 35 containing the friction elements 36 is positioned on the brake shoe 15 in a manner that the leading end 50 of the friction elements is not substantially above the force line 51 applied by the plunger 31 as taken on the axis of the wheel cylinder 30. If the friction elements 36 are placed a substantial distance above the force line 51, the angle between the force line 51 and the engagement of the elements 36 with tthe drum approaches a locking angle and, therefore, it is desirable that the leading edge 50 of the friction elements 36 shall be approximately at the force line 51.

While the embodiments of the present invention as herein disclosed constitute a preferred form, it is to be understood that other forms might be adopted.

What is claimed is as follows:

1. A vehicle servo brake comprising, a brake drum, a pair of brake shoes movable relative to said drum to produce therewith a braking action, one of said shoes leading the other in the direction of rotation of the drum from an anchor point and providing a primary shoe, the other of said shoes forming a secondary shoe, said shoes having friction surfacing material thereon essentially of metallic constituents engageable with said drum, the said friction surfacing material comprising sintered ferrous material as the major constituent and including graphite as a minor constituent in quantities of from 20% to 30% by weight, said primary shoe having a first area of said friction surfacing material at the leading end of the shoe and a second area of said friction surfacing material at the trailing end of the shoe, said secondary shoe having a third area of said friction surfacing material, said first area having a coefficient of friction substantially greater than the coefficient of friction of said third area with the graphite content of said first area substantially less than the graphite content of said third area and including friction modifying material effecting the said increase of coefficient of friction of said first area, said second area having a friction modifying material less than that of said first area effecting a coefficient of friction intermediate that of the first and third areas.

2. A vehicle servo brake comprising, a brake drum, a pair of brake shoes movable relative to said drum to produce therewith a braking action, one of said shoes leading the other in the direction of rotation of the drum from an anchor point and providing a primary shoe, the other of said shoes forming a secondary shoe, said shoes having friction surfacing material thereon essentially of metallic constituents engageable with said drum, the said friction surfacing material comprising sintered ferrous material as the major constituent and graphite as a minor constituent in quantities on the order of 20% to 30% by weight, said primary shoe having a first area of said friction surfacing material at the leading end of the shoe and a second area of said friction surfacing material at the trailing end of the shoe in spatial separation from said first area, said secondary shoe having a third area of said friction surfacing material greater than the total friction material area of said primary shoe, said first area having a coefficient of friction substantially greater than the coefficient of friction of said third area with the graphite content of said first area substantially less than the graphite content of said third area, said first area including a friction modifying agent to increase the coefficient of friction of the first area relative to said third area, said second area including a friction modifying agent to increase the coefficient of friction above that of said third area but insufficient to reach the coefficient of friction of said first area.

3. A vehicle servo brake constructed and arranged in accordance with the structure set forth in claim 2 with the surface engagement of the first area with the drum being on the order of 20% of the engagement of said third area with the drum, said second area having a surface engagement on the order of 40% of the surface engagement of the third area with the drum.

4. A vehicle brake constructed and arranged in accordance with the structure set forth in claim 5 wherein the friction surfacing material of said first area has a graphite component approaching 20% by weight but not less than said 20%, said friction surfacing material of said third area having a graphite component approaching 30% by weight but not exceeding the same.

5. A vehicle brake comprising, a brake drum, a pair of brake shoes movable relative to said drum to produce therewith a braking action, one of said shoes leading the other in the direction of rotation of the drum from anchor means positioned between cooperating adjacent ends of said shoes, said leading shoe providing a primary shoe, the other of said shoes forming a secondary shoe, brake shoe actuating means engaging at least said primary shoe adjacent said anchor means to move said primary shoe into engagement with said drum, said shoes both being movable toward said drum for brake engagement therewith with said secondary shoe being driven by said primary shoe, said shoes having friction surfacing material thereon primarily of sintered ferrous material engageable with said drum, said primary shoe having a first segment area of said friction surfacing material at the leading end of the shoe and a second segment area of said friction surfacing material at the trailing end of the shoe in spatial separation from said first area, said secondary shoe having a third area of said friction surfacing material greater than the total of said first and second areas, said first area having a coefficient of friction substantially greater than the coefficient of friction of said third area, said second area having a coefficient of friction between that of the first and third areas, said first area being positioned on said primary shoe relative to the line of actuating force to said primary shoe from said actuating means such that the leading edge of said first area is not substantially above the said line of force in a direction toward the said anchor means.

References Cited in the file of this patent

UNITED STATES PATENTS

| | | |
|---|---|---|
| 1,930,779 | Snell | Oct. 17, 1933 |
| 2,028,621 | Norton | Jan. 21, 1936 |
| 2,863,211 | Wellman | Dec. 9, 1958 |

FOREIGN PATENTS

| | | |
|---|---|---|
| 1,079,566 | France | May 19, 1954 |